US008462668B2

(12) United States Patent
Kuo et al.

(10) Patent No.: US 8,462,668 B2
(45) Date of Patent: Jun. 11, 2013

(54) SYSTEM AND METHOD FOR IMPLEMENTATION OF LAYER 2 REDUNDANCY PROTOCOLS ACROSS MULTIPLE NETWORKS

(75) Inventors: Andrew Tai-Chin Kuo, Newark, CA (US); Gurudeep Kamat, Mountain View, CA (US); Jordi Moncada-Elias, Milpitas, CA (US); Ivy Pei-Shan Hsu, Pleasanton, CA (US); Rajkumar Jalan, Saratoga, CA (US)

(73) Assignee: Foundry Networks, LLC, San Jose, CA (US)

( * ) Notice: Subject to any disclaimer, the term of this patent is extended or adjusted under 35 U.S.C. 154(b) by 1346 days.

(21) Appl. No.: 10/261,946

(22) Filed: Oct. 1, 2002

(65) Prior Publication Data
US 2009/0274153 A1 Nov. 5, 2009

(51) Int. Cl.
*H04L 12/28* (2006.01)
(52) U.S. Cl.
USPC ............ 370/255; 370/256; 370/389; 370/392
(58) Field of Classification Search
None
See application file for complete search history.

(56) References Cited

U.S. PATENT DOCUMENTS

| | | | |
|---|---|---|---|
| 5,473,599 A | 12/1995 | Li et al. | |
| 6,032,194 A | 2/2000 | Gai et al. | |
| 6,285,656 B1 | 9/2001 | Chaganty et al. | |
| 6,304,575 B1 | 10/2001 | Carroll et al. | |
| 6,373,826 B1 | 4/2002 | Russell et al. | |
| 6,397,260 B1 | 5/2002 | Wils et al. | |
| 6,470,395 B1 * | 10/2002 | Van Aken et al. | 709/245 |
| 6,493,825 B1 | 12/2002 | Blumenau et al. | |
| 6,501,756 B1 | 12/2002 | Katsube et al. | |
| 6,535,490 B1 | 3/2003 | Jain | |
| 6,556,541 B1 * | 4/2003 | Bare | 370/235 |
| 6,717,922 B2 | 4/2004 | Hsu et al. | |
| 6,728,777 B1 * | 4/2004 | Lee et al. | 709/238 |
| 6,766,482 B1 | 7/2004 | Yip et al. | |
| 6,813,250 B1 * | 11/2004 | Fine et al. | 370/256 |
| 6,839,348 B2 * | 1/2005 | Tang et al. | 370/390 |
| 6,850,531 B1 | 2/2005 | Rao et al. | |

(Continued)

OTHER PUBLICATIONS

"Functional Description: Health Check/Fabric Checksum," printed on Feb. 12, 2002, available at http://www.extremenetworks.com/services/HealthCheck.aspx (5 pages).

(Continued)

*Primary Examiner* — Marsha D Banks Harold
*Assistant Examiner* — Anthony Sol
(74) *Attorney, Agent, or Firm* — Fountainhead Law Group P.C.

(57) ABSTRACT

The system, method, and article of manufacture of the present invention allows multiple customers connected to a common external network to each implement a layer 2 redundancy protocol, such as the spanning tree protocol, in order to prevent layer 2 loops. Accordingly, a method is presented for providing an independent loop free layer 2 topology between a external network and a customer network comprising tagging control packets originating on the customer network with a unique identifier and tunneling the control packets received from the customer network between a plurality of boundary interface devices at the external network such that the control packets are routed back to the customer network based on the presence of the unique identifier in the control packet. The layer 2 redundancy protocol on the customer network converges based at least in part on the presence of control packets appearing on more than one port on the customer network.

13 Claims, 9 Drawing Sheets

U.S. PATENT DOCUMENTS

| | | | |
|---|---|---|---|
| 6,856,591 B1 | 2/2005 | Ma et al. | |
| 6,879,594 B1 * | 4/2005 | Lee et al. | 370/408 |
| 6,891,808 B2 | 5/2005 | Ishii | |
| 6,952,397 B2 | 10/2005 | Mor et al. | |
| 6,954,436 B1 | 10/2005 | Yip et al. | |
| 6,987,740 B1 * | 1/2006 | Di Benedetto et al. | 370/256 |
| 7,003,705 B1 | 2/2006 | Yip et al. | |
| 7,027,406 B1 | 4/2006 | Shabtay et al. | |
| 7,126,923 B1 * | 10/2006 | Yang et al. | 370/256 |
| 7,154,861 B1 | 12/2006 | Merchant et al. | |
| 7,209,435 B1 | 4/2007 | Kuo et al. | |
| 7,289,496 B2 | 10/2007 | Donoghue et al. | |
| 7,340,535 B1 | 3/2008 | Alam | |
| 7,359,984 B1 * | 4/2008 | Hackney | 709/238 |
| 7,389,359 B2 | 6/2008 | Jain et al. | |
| 7,389,496 B2 | 6/2008 | Eckhart et al. | |
| 7,558,195 B1 | 7/2009 | Kuo et al. | |
| 8,014,301 B2 | 9/2011 | Kuo et al. | |
| 2002/0184376 A1 | 12/2002 | Sternagle | |
| 2003/0037165 A1 | 2/2003 | Shinomiya | |
| 2003/0048501 A1 | 3/2003 | Guess et al. | |
| 2003/0048746 A1 | 3/2003 | Guess et al. | |
| 2003/0086422 A1 * | 5/2003 | Klinker et al. | 370/389 |
| 2003/0179707 A1 * | 9/2003 | Bare | 370/235 |
| 2003/0193959 A1 * | 10/2003 | Lui et al. | 370/401 |
| 2003/0225908 A1 * | 12/2003 | Srinivasan et al. | 709/243 |
| 2006/0092862 A1 * | 5/2006 | Benedetto et al. | 370/256 |
| 2007/0008942 A1 * | 1/2007 | Ocepek et al. | 370/338 |
| 2009/0003213 A1 | 1/2009 | Tzeng | |
| 2009/0296565 A1 | 12/2009 | Kuo et al. | |

OTHER PUBLICATIONS

Non-Final Office Action for U.S. Appl. No. 10/124,449, mailed Jun. 13, 2006, 17 pages.
Notice of Allowance for U.S. Appl. No. 10/124,449, mailed Feb. 28, 2007, 9 pages.
Non-Final Office Action for U.S. Appl. No. 11/695,458, mailed Oct. 2, 2008, 11 pages.
Final Office Action for U.S. Appl. No. 11/695,458, mailed Mar. 19, 2009, 8 pages.
Notice of Allowance for U.S. Appl. No. 11/695,458, mailed Apr. 16, 2009, 5 pages.
Non-Final Office Action for U.S. Appl. No. 10/090,669, mailed May 27, 2003.
Final Office Action for U.S. Appl. No. 10/090,669, mailed Sep. 18, 2003.
Notice of Allowance for U.S. Appl. No. 10/090,669, mailed Nov. 13, 2003.
*Brocade Communication Systems, Inc. v. A10 Networks, Inc.*, Civil Action 10-332—Civil Cover Sheet, filed on Apr. 23, 2010, 1 page.
*Brocade Communication Systems, Inc. v. A10 Networks, Inc.*, Civil Action 10-332—Complaint for Patent Infringement, filed on Apr. 23, 2010, 14 pages.
*Brocade Communication Systems, Inc. v. A10 Networks, Inc.*, Civil Action 10-332—Exhibit A to the Complaint (U.S. Patent No. 7,558,195 B1, issued on Jul. 7, 2009, Kuo et al.), 29 pages.
*Brocade Communication Systems, Inc. v. A10 Networks, Inc.*, Civil Action 10-332—Exhibit B to the Complaint (U.S. Patent No. 7,581,009 B1, issued on Aug. 25, 2009, Hsu et al.), 15 pages.
*Brocade Communication Systems, Inc. v. A10 Networks, Inc.*, Civil Action 10-332—Exhibit C to the Complaint (U.S. Patent No. 7,454,500 B1, issued on Nov. 18, 2008, Hsu et al.), 12 pages.
*Brocade Communication Systems, Inc. v. A10 Networks, Inc.*, Civil Action 10-332—Exhibit D to the Complaint (U.S. Patent No. 7,574,508 B1, issued on Aug. 11, 2009, Kommula), 15 pages.
*Brocade Communication Systems, Inc. v. A10 Networks, Inc.*, Civil Action 10-332—Exhibit E to the Complaint (U.S. 7,647,427 B1, issued on Jan. 12, 2010, Devarapalli), 10 pages.
*Brocade Communication Systems, Inc. v. A10 Networks, Inc.*, Civil Action 10-332—Exhibit F to the Complaint (U.S. 7,657,629 B1, issued on Feb. 2, 2010, Kommula), 20 pages.
*Brocade Communication Systems, Inc. v. A10 Networks, Inc.*, Civil Action 10-332—Exhibit G to the Complaint (U.S. 7,584,301 B1, issued on Sep. 1, 2009, Joshi), 16 pages.

Civil Action 10-332—Second Amended and Supplemental Complaint for Patent Infringement, filed on Jul. 16, 2010, with Exhibits A through I, 158 pages.
Civil Action 10-332—Report on the Filing or Determination of an Action Regarding a Patent or Trademark, filed on Aug. 5, 2010, 2 pages.
Civil Action 10-332—Notice of Voluntary Dismissal Without Prejudice, filed on Aug. 5, 2010, 2 pages.
Civil Action—CV10-03428—Complaint for Patent Infringement, Trade Secret Misappropriation, Breach of Contract, Interference with Contract, and Unfair Competition Under Cal. Bus. & Prof. Code §§ 17200 et seq., filed on Aug. 4, 2010, with Exhibits A through M, 196 pages.
Civil Action—Case No. CV10-03443—Complaint for Declaratory Judgment, filed on Aug. 6, 2010, with Exhibits A through I, 153 pages.
Civil Action CV10-03428—First Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., filed on Oct. 29, 2010, 237 pages, with Exhibits A through P.
Non-Final Office Action for U.S. Appl. No. 12/477,069, mailed on Jan. 11, 2011, 25 pages.
Notice of Allowance for U.S. Appl.No. 12/477,069, mailed on Apr. 22, 2011, 13 pages.
Civil Action CV10-03428—Second Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Inference with Contract, and Unfair Competition Under Cal. Bus. & Prof. Code §§ 17200 et seq., Filed Apr. 13, 2011, 238 pages, with Exhibits A through P.
Civil Action CV10-03428—Third Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Inference with Contract, and Unfair Competition Under Cal. Bus. & Prof. Code §§ 17200 et seq., Filed Apr. 29, 2011, 318 pages, with Exhibits A through T.
Civil Action CV10-03428—A10 Networks, Inc.'s, Lee Chen's, Rajkumar Jalan's, Ron Szeto's, Liang Han's, and Steve Hwang's Answer to Third Amended Complaint, Affirmative Defenses, and A10's Counterclaims, Filed May 16, 2011, 40 pages.
Civil Action CV10-03428—Plaintiffs and Counterclaim Defendants Brocade Communications Systems, Inc. and Foundry Networks, LLC's Answer to Defendant A10 Networks, Inc.'s Counterclaims, Filed May 27, 2011, 12 pages.
Reexamination Documents for U.S. Patent No. 7,558,195, filed Jun. 27, 2011, 63 pages, included: Request for Reexamination Transmittal Form; Request for *Ex Parte* Reexamination; Form PTO/SB/08; Exhibit A—U.S. Patent No. 7,558,195; Exhibit B—Terminal Disclaimer; and Exhibit C—U.S. Patent Publication No. 2003/0048501.
Final Office Action for Ex Parte Reexamination of U.S. Patent No. 7,558,195, U.S. Appl. No. 90/011,771, mailed Jul. 19, 2012, 67 pages.
Lei, et al., "Method and Apparatus for Link Redundancy in Virtual Switch Redundancy Protocol," U.S. Appl. No. 61/315,889, filed Mar. 19, 2010, 21 pages.
"BlackDiamond 6800 Series Switch Hardware Installation Guide," Extreme Networks, Apr. 201, 93 pages.
ExtremeWare Software User Guide, Extreme Networks, Inc., Apr. 1999, 291 pages.
Office Action is Ex Parte Reexamination for Control No. 90/011,771, mailed Nov. 18, 2011, 15 pages.
Order Granting Request for Ex Parte Reexamination for Control No. 90/011,771, mailed Jul. 22, 2011, 13 pages.
Ex Parte Reexamination Interview Summary for Control No. 90/011,771, mailed Jul. 14, 2011, 3 pages.
Request for Inter Partes Reexamination for U.S. Patent No. 7,558,195 B1, request filed on Nov. 10, 2011, 104 pages. Included: Exhibits A and B.

Notice of Inter Partes Reexamination Request Filing Date for Control No. 95/001,815, mailed Nov. 30, 2011, 1 page.
Notice of Assignment of Inter Partes Reexamination Request for Control No. 95/001,815, mailed Nov. 30, 2011, 1 page.
Office Action in Inter Partes Reexamination for Control No. 95/001,815, mailed Dec. 16, 2011, 14 pages.
Civil Action—Case No. CV10-03443—Notice of Voluntary Dismissal Without Prejudice, filed Aug. 16, 2010, 2 pages.
Civil Action—CV10-03428—Order Reassigning Case. Case reassigned to Judge Hon. Lucy H. Koh for all further proceedings. Judge Magistrate Judge Elizabeth D. Laporte no longer assigned to the case, filed Aug. 16, 2010, 1 page.
Civil Action—CV10-03428—Motion to Dismiss Complaint filed by A10 Networks, Inc., Lee Chen, Rajkumar Jalan, Ron Szeto, filed Oct. 11, 2010, 30 pages.
Civil Action CV10-03428—Notice of Motion and Motion to Dismiss First Amended Complaint filed by A10 Networks, Inc., Lee Chen, Rajkumar Jalan, Ron Szeto. Motion Hearing set for Feb. 17, 2011 01:30 PM in Courtroom 4, 5th Floor, San Jose, filed Nov. 12, 2010, 34 pages.
Civil Action CV10-03428—Declaration of Scott R. Mosko in Support of Motion to Dismiss First Amended Complaint filed by A10 Networks, Inc., Lee Chen, Rajkumar Jalan, Ron Szeto, filed Nov. 12, 2010, 56 pages, with Exhibits A and B.
Civil Action CV10-03428—Memorandum in Opposition re Motion to Dismiss First Amended Complaint filed by Brocade Communications Systems, Inc., Foundry Networks, LLC, filed Jan. 27, 2011, 33 pages.
Civil Action CV10-03428—Reply to Opposition re Motion to Dismiss First Amended Complaint filed by A10 Networks, Inc., Lee Chen, Liang Han, Steve Hwang, Rajkumar Jalan, Ron Szeto, filed Feb. 3, 2011, 20 pages.
Civil Action CV10-03428—Order by Judge Lucy H. Koh granting in part and denying in part Motion to Dismiss First Amended Complaint, filed Mar. 23, 2011, 19 pages.
Civil Action CV10-03428—A10 Networks, Inc.'s Answer to Plaintiffs Brocade Communications Systems, Inc. and Foundry Networks, LLC's Counterclaims, Filed Jun. 17, 2011, 4 pages.
Civil Action CV10-03428—Motion to Stay Defendants' Motion to Stay Proceedings Pending Reexaminations filed by A10 Networks, Inc., Lee Chen, Liang Han, Steve Hwang, Rajkumar Jalan, Ron Szeto, filed Jul. 1, 2011, 26 pages. Included: Affidavit Declaration of Scott R. Mosko in Support of Motion; Proposed Order, Exhibits 1 and 2.
Civil Action CV10-03428—Opposition to Motion to Stay Proceedings Pending Reexaminations filed by Brocade Communications Systems, Inc., Foundry Networks, LLC, filed Jul. 15, 2011, 20 pages, including Proposed Order.
Civil Action CV10-03428—Declaration of Siddhartha M. Venkatesan in Support of Opposition/Response to Motion, Plaintiffs' Opposition to Defendants' Motion to Stay Proceedings filed by Brocade Communications Systems, Inc., Foundry Networks, LLC, filed Jul. 15, 2011, 70 pages, including Exhibits A-E.
Civil Action CV10-03428—Reply to Plaintiffs' Opposition to Defendants' Motion to Stay Proceedings Pending Reexaminations filed by A10 Networks, Inc., filed Jul. 22, 2011, 34 pages, including Mosko Declaration, Exhibits A, C, and D.
Civil Action CV10-03428—Memorandum in Support of Motion for Temporary Restraining Order and Preliminary Injunction [Redacted Version] filed by Brocade Communications Systems, Inc., Foundry Networks, LLC, filed Jul. 26, 2011, 34 pages, including Proposed Order for Temporary Restraining Order and Order to Show Cause and Proposed Preliminary Injunction.
Civil Action CV10-03428—Declaration of Andrew (Andy) Guerrero in Support of Motion for Temporary Restraining Order [Redacted Version] of Plaintiffs' Memorandum in Support of Motion for Temporary Restraining Order and Preliminary Injunction [Redacted Version] of Andrew (Andy) Guerrero ISO Plaintiffs' Motion for TRO and Preliminary Injunction filed by Brocade Communications Systems, Inc., Foundry Networks, LLC, filed Jul. 26, 2011, 3 pages.
Civil Action CV10-03428—Declaration of Fabio E. Marino in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 2 pages.
Civil Action CV10-03428—Declaration of Keith Stewart in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 5 pages.
Civil Action CV10-03428—Declaration of Mani Prasad Kancherla in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 5 pages.
Civil Action CV10-03428—Declaration of Prasad Aluri in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 3 pages.
Civil Action CV10-03428—Declaration of Robert D. Young in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 46 pages, including Redacted Exhibits 1-8.
Civil Action CV10-03428—Declaration of Lisa McGill in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 165 pages, including Exhibits 1-30. (due to size, reference will be uploaded in three parts).
Civil Action CV10-03428—Plaintiffs' Reply Memorandum in Further Support of Motion for Temporary Restraining Order and Preliminary Injunction[Redacted Version] filed by Brocade Communications Systems, Inc., Foundry Networks, LLC, filed Aug. 4, 2011, 22 pages.
Civil Action CV10-03428—Notice of Errata re Reply Memorandum in Further Support of Motion for Temporary Restraining Order and Preliminary Injunction by Brocade Communications Systems, Inc., Foundry Networks, LLC, filed Aug. 5, 2011, 2 pages.
Civil Action CV10-03428—Notice of Granted Requests for Reexamination of Patents 7,558,195, 7,657,629, 7,840,678, Filed Aug. 5, 2011, 316 pages. Included: Exhibits A through C.
Civil Action CV10-03428—Order by Judge Lucy H. Koh denying Motion to Stay; finding as moot Motion to Compel; denying Motion to Qualify Expert Kevin Jeffay Under the Protective Order; granting in part and denying in part Motion for Sanctions; granting Motion to Order A10 to File Confidential Information Under Seal; granting Motion for Leave to File Supplemental Authority, filed Aug. 12, 2011, 2 pages.
Civil Action CV10-03428—Order Denying Motion for Temporary Restraining Order [Redacted Version] of Plaintiffs' Memorandum in Support of Motion for Temporary Restraining Order and Preliminary Injunction filed by Brocade Communications Systems, Inc., Foundry Networks, LLC, filed Aug. 16, 2011, 5 pages.
Civil Action CV10-03428—Joint Claim Construction, Filed Aug. 26, 2011, 29 pages.
Civil Action CV10-03428—Defendant's A10 Networks, Inc.'s, Lee Chen's, Rajkumar Jalan's, Ron Szeto's, David Cheung's, Liang Han's, and Steven Hwang's Invalidity Contentions, No Filing Date, 779 pages, Including Exhibits A through M. (due to size, reference will be uploaded in two parts), Jun. 27, 2011.

Civil Action CV10-03428—Redacted Declaration of David Klausner in Support of Opposition to Plaintiffs' Motion for Temporary Restraining Order and Preliminary Injunction, by A10 Networks, Inc., filed Sep. 28, 2011, 9 pages.

Civil Action CV10-03428—Redacted Declaration of Dr. Chi Zhang in Support of Opposition to Plaintiffs' Motion for Temporary Restraining Order and Preliminary Injunction, by A10 Networks, Inc., filed Sep. 28, 2011, 4 pages.

Civil Action CV10-03428—Notice of Motion for Partial Summary Judgment on Assignor Estoppel, filed by Brocade Communications Systems, Inc., Foundry Networks, LLC, filed Oct. 11, 2011, 21 pages.

Civil Action CV10-03428—Declaration of Teri H.P. Nguyen in Support of Motion for Partial Summary Judgment Notice of Motion and Motion for Partial Summary Judgment on Assignor Estoppel filed by Brocade Communications Systems, Inc., Foundry Networks, LLC, filed Oct. 11, 2011, 259 pages, including Exhibits A-R.

Civil Action CV10-03428—Motion for Summary Judgment of Noninfringement of U.S. Patent No. 7,558,195, filed by A10 Networks, Inc., Lee Chen, Rajkumar Jalan, filed Oct. 11, 2011, 12 pages. Included: Proposed Order.

Civil Action CV10-03428—Declaration of John Chiong in Support of Defendant and Counterclaim-Plaintiff A10 Networks, Inc.'s and Defendants Lee Chen's and Rajkumar Jalan's Motion for Summary Judgment of Noninfringement of U.S. Patent No. 7,558,195 filed by A10 Networks, Inc., Lee Chen, Rajkumar Jalan, filed Oct. 11, 2011, 3 pages.

Civil Action CV10-03428—Initial Claim Construction Brief, filed by Brocade Communications Systems, Inc., Foundry Networks, LLC, filed Oct. 11, 2011, 31 pages.

Civil Action CV10-03428—Declaration of Scott A. Herbst in Support of Defendant and Counterclaim-Plaintiff A10 Networks, Inc.'s and Defendants Lee Chen's and Rajkumar Jalan's Motion for Summary Judgment of Noninfringement of U.S. Patent No. 7,558,195 filed by A10 Networks, Inc., Lee Chen, Rajkumar Jalan, filed Oct. 11, 2011, 119 pages. Included: Exhibits 1 through 4.

Civil Action CV10-03428—Declaration of Nitin Gambhir of Brocade Communications Systems, Inc. and Foundry Networks, LLC's Motion for Summary Judgment of Infringement of U.S. Patent Nos. 7,454,500; 7,581,009; 7,657,629; 7,584,301; 7,840,678; 7,716,370; 7,647,427; and 7,558,195 filed by Brocade Communications Systems, Inc., Foundry Networks, LLC., filed Oct. 11, 2011, 251 pages. Included: Exhibits A through H and Proposed Order.

Civil Action CV10-03428—Administrative Motion to File Under Seal Brocade Communications Systems, Inc. and Foundry Networks, LLC's Administrative Motion for Leave to File Under Seal Notice of Errata and Submission of Corrected Brief filed by Brocade Communications Systems, Inc., Foundry Networks, LLC, filed Oct. 13, 2011, 8 pages including Proposed Order and Declaration.

Civil Action CV10-03428—Order by Judge Lucy H. Koh denying Motion for Leave to File Excess Pages and Striking Plaintiffs' Motion for Summary Judgment on Infringement, filed Oct. 18, 2011, 2 pages.

Civil Action CV10-03428—Declaration of Nitin Gambhir in Support of Brocade Communications Systems, Inc.'s and Foundry Networks, LLC's (1) Motion for Partial Summary Judgment of Infringement of U.S. Patent Nos. 7,647,427 and 7,716,370 [Filed Under Seal]; (2) Opposition to Defendants' Motion for Summary Judgment of Non-Infringement of U.S. Patent Nos. 7,647,427 and 7,716,370 [Filed Under Seal]; and (3) Opposition to Defendants' Motion for Summary Judgment of Non-Infringement of U.S. Patent No. 7,558,195 [Filed Under Seal] filed by Brocade Communications Systems, Inc., Foundry Networks, LLC, filed Nov. 8, 2011, 136 pages. Included: Exhibits D, F, G, H, I, L, and M.

Civil Action CV10-03428—Opposition re Motion for Partial Summary Judgment on Assignor Estoppel Defendant and Counterclaimant A10 Networks, Inc.'s, and Defendants Lee Chen's, Rajkumar Jalan's, and Ron Szeto's Opposition to Plaintiffs Brocade Communications Systems, Inc.'s and Foundry Networks, LLC's Motion for Partial Summary Judgment on Assignor Estoppel filed by A10 Networks, Inc., Lee Chen, Rajkumar Jalan, Ron Szeto, filed Nov. 8, 2011, 17 pages.

Civil Action CV10-03428—Responsive Claim-Construction Brief (PLR 4-5(b)) by A10 Networks, Inc., Lee Chen, Rajkumar Jalan, filed Nov. 15, 2011, 28 pages.

Civil Action CV10-03428—Declaration of Scott R. Mosko in Support of Defendant and Counterclaimant A10 Networks, Inc.'s and Defendants Lee Chen's and Rajkumar Jalan's Responsive Claim Construction Brief (PLR 4-5(b)) filed by A10 Networks, Inc., Lee Chen, Rajkumar Jalan, filed Nov. 15, 2011, 70 pages.

Civil Action CV10-03428—Declaration of J. Douglas Tygar, Ph.D. in Support of Defendant and Counterclaimant A10 Networks, Inc.'s and Defendants Lee Chen's and Rajkumar Jalan's Responsive Claim Construction Brief (PLR 4-5(b)) filed by A10 Networks, Inc., Lee Chen, Rajkumar Jalan, filed on Nov. 15, 2011, 77 pages.

Civil Action CV10-03428—Administrative Motion to Consider Whether Cases Should be Related, filed by Brocade Communications Systems, Inc., Foundry Networks, LLC, filed Nov. 21, 2011, 8 pages, including Declaration and Proposed Order.

Civil Action CV10-03428—Reply Claim Construction Brief filed by Brocade Communications Systems, Inc., Foundry Networks, LLC, filed Nov. 22, 2011, 22 pages.

Civil Action CV10-03428—Declaration of Nitin Gambhir in Support of Reply Claim Construction Brief, filed by Brocade Communications Systems, Inc., Foundry Networks, LLC, filed Nov. 22, 2011, 12 pages including Exhibit A.

Civil Action CV10-03428—Reply in Support of Motion for Summary Judgment of Noninfringement of U.S. Patent No. 7,558,195 filed by A10 Networks, Inc., Lee Chen, Rajkumar Jalan, filed Nov. 22, 2011, 11 pages.

Civil Action CV10-03428—Motion to Stay Defendant and Counterclaimant A10 Networks, Inc.'s and Defendants Lee Chen's Rajkumar Jalan's, Ron Szeto's and Steve Hwang's Renewed Motion to Stay All Proceedings Pending Inter Partes Reexamination (All Patents Asserted by Plaintiffs) filed by A10 Networks, Inc., Lee Chen, Steve Hwang, Rajkumar Jalan, Ron Szeto, filed Nov. 23, 2011, 15 pages. Included: Proposed Order.

Civil Action CV10-03428—Declaration of Scott A. Herbst Declaration of Scott A. Herbst in Support of Defendant and Counterclaimant A10 Networks, Inc.s and Defendants Lee Chens, Rajkumar Jalans, Ron Szetos, and Steve Hwangs Renewed Motion to Stay All Proceedings Pending Inter Partes Reexamination (All Patents Asserted by Plaintiffs) filed by A10 Networks, Inc., Lee Chen, Steve Hwang, Rajkumar Jalan, Ron Szeto, filed Nov. 23, 2011, 25 pages, with exhibits 1-6.

Civil Action CV10-03428—Litigation Docket, printed on Nov. 26, 2011, 44 pages.

Terminal Disclaimer for U.S. Appl. No. 11/695,458, filed Apr. 1, 2009, 1 page.

Chakraborty et al, "Improvement in Reliability of the Token Ring Network by Reversal of Token in Case of a Single Component Failure". IEEE. 1993. pp. 1152-1154.

Cisco Systems Inc., "Understanding Spanning-Tree Protocol," 8 pages, Copyright 1989-1997.

IEEE Std 802.1D, IEEE Standard for Information Technology—Telecommunications and Information Exchange Between Systems—Local and Metropolitan Area Networks—Common Specifications, Part 3: Media Access Control (MAC) Bridges, *ANSI/IEEE* Std 802.1D, 1998.

IEEE Std 802.1w, IEEE Standard for Local and Metropolitan Area Networks—Common Specifications, Part 3: Media Access Control (MAC) Bridges—Amendment 2: Rapid Reconfiguration, IEEE Std 802.w-2001[Amendment to IEEE Std 802.1D, 1998 Edition (ISO/IEC 15802-3:1998) and IEEE Std 802.1t-2001].

IEEE Std P802.1s, Draft Standard for Local and Metropolitan Area Networks—Amendment 3 to 802.1q Virtual Bridged Local Area Networks: Multiple Spanning Tree, *IEEE*, P802.1s, D14.1, Jul. 2002.

Intel. RTM. Express 460T Standalone Switch Description of Spanning Tree Protocol, 1 page, http://support.intel.com/support/express/switches/460/30280.htm., Aug. 15, 2002.

Latif et al. "The IBM 8209 LAN Bridge," *IEEE Network*. May 1992. pp. 28-37.

Li et al., "Cisco Hot Standby Router Protocol" (HSRP), pp. 1-15, Mar. 1998.

Minimum Spanning Tree Demonstration Program; 1 page, http://www.engr.orst.edu/.about.girardma/javaProgs/minST/MinST.html., Feb. 12, 2002.

Perry et al., "Novell, Source Routing and the Spanning-Tree Protocol," Aug. 1991, 38 pages, http://developer.nov/research/appnotes/1991/august/01.

Spanning Tree Software Package, Products, 3 pages, http://www.tassogroup.com/products.html., Feb. 12, 2002.

Tech Brief, "Redundancy in the Application-Aware Data Center," Extreme Networks, 6 pages; www.extremenetworks.com., Copyright 2001.

Virtual Router Redundancy Protocol (vrrp), 31 pages, http://www.ietf.org/html.charters/vrrp-charter.html., Feb. 13, 2002.

Whatis.com Word of the Day, 2 pages, Copyright 2000-2002, Tech Target.

* cited by examiner

SYSTEM AND METHOD FOR IMPLEMENTATION OF LAYER 2 REDUNDANCY PROTOCOLS ACROSS MULTIPLE NETWORKS

RELATED APPLICATIONS

This application is related to the following commonly owned patent applications, each of which applications is hereby incorporated by reference herein in its entirety:

application Ser. No. 10/124,449 (now U.S. Pat. No. 7,209,435), filed on Apr. 16,2002 and titled "SYSTEM AND METHOD FOR PROVIDING NETWORK ROUTE REDUNDANCY ACROSS LAYER 2 DEVICES", and application Ser. No. 10/090,669 (now U.S. Pat. No. 6,717,922), filed on Mar. 4, 2002 and titled "NETWORK CONFIGURATION PROTOCOL AND METHOD FOR RAPID TRAFFIC RECOVERY AND LOOP AVOIDANCE IN RING TOPOLOGIES".

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates generally to network configuration protocols. More specifically, the invention relates to providing redundancy and eliminating loops in disparate interconnected networks each implementing one or more independent instances of a layer 2 redundancy protocol or protocols.

Two basic requirements for computer networks are the availability of redundancy and the prevention of loops. Redundancy is needed so that a fault or break in a device or path in the network does not cut off traffic flow in the network. Loops occur when a network has multiple active paths between devices at any given time, resulting in the duplication of messages. Loops are prevented by keeping only one active path between devices at any given time. Since both redundancy and loop prevention involve configuration and selection of active and inactive paths, a network must carefully manage the states of its paths to satisfy both needs.

One solution to the problem of providing redundancy while preventing loops is the spanning tree algorithm or protocol. The spanning tree protocol, defined in IEEE 802.1, is used by bridges in a network to dynamically discover a subset of the network topology that provides path redundancy while preventing loops. Spanning tree protocol provides redundancy by defining a single tree that spans the bridges and maintaining all other paths and connections in a standby or blocked state. The protocol allows bridges to transmit messages to one another to thereby allow each bridge to select its place in the tree and which states should be applied to each of its ports to maintain that place. For example, a port in a given bridge that is connected to an active path at a given time is kept in a forwarding state in which all data traffic is received and transmitted to the next portion of the network; ports in the bridge that are connected to inactive paths are kept in a non-forwarding state, such as a blocking state, in which traffic is blocked through that port.

Bridges in a spanning tree network pass bridge protocol data units, or BPDUs, amongst themselves. Each BDPU comprises information including root, bridge and port identifiers, and path cost data. This information is used by the bridges, among other things, to "elect" one of the bridges in the spanning tree network to be a unique root bridge for the network, calculate the shortest least cost path from each bridge to the root bridge, select which ports will be blocking, and for each LAN, elect one of the bridges residing in the LAN to be a designated bridge.

In brief, the election of a root bridge is performed by each bridge initially assuming itself to be the root bridge, each bridge transmitting root BPDUs, each bridge comparing its BDPU information with that received from other bridges, and each bridge deciding whether to stop serving as a root and stop transmitting BPDUs when the configuration of another bridge as root is more advantageous than the bridge itself serving as root. Ports being converted from blocking to forwarding states and back again undergo several possible transition states depending upon the BPDUs received. Once the bridges have all reached their decisions, the network stabilizes or converges, thereby becoming loop-free. A similar process is followed after a link failure occurs in the network, in which case a new root and/or new active paths must be identified. An overview of the spanning tree protocol, which is well known to those of skill in the art, can be found in the document "Understanding Spanning-Tree Protocol", located at http://www.cisco.com/univercd/cc/td/doc/product/rtrmgmt/sw_ntman/cwsimain/cwsi2/cwsiug2/v lan2/stpap-p.htm and herein incorporated by reference in its entirety.

The spanning tree protocol, however, suffers from several limitations when implemented in multiple large interconnected networks. Standard spanning tree protocol is prone to slow convergence times, sometimes upward of 30 to 50 seconds, and does not scale well as a topology expands to include additional spanning tree nodes. Additionally, spanning tree domains must be continuous in order to ensure a loop free data path—changes within the spanning tree domain can affect all spanning tree members of that domain. Such ripple effects, for example, can cause problems in one city to affect other cites where large metroring topologies are implemented.

There is thus a need for systems and methods whereby networks are organized into layer 2 redundancy domains that overcome the drawbacks associated with current spanning tree protocol and other layer 2 redundancy protocol implementations and that are smaller, easier to manage, and faster converging. There is a further need for system and methods that allow an external network to host a plurality of customer networks, each implementing distinct instances of the spanning tree protocol, while maintaining the integrity of each of the hosted customer networks.

BRIEF SUMMARY OF THE INVENTION

The present invention provides a network configuration protocol and algorithm that resolves deficiencies with prior protocols. Accordingly, the invention disclosed herein presents a method for providing an independent loop free Layer 2 convergence for an interconnected external network and a customer network. The external network may be any network that is external to the customer network, including but not limited to a service provider network that provides wide area connectivity to the customer network, e.g., connectivity to the Internet.

To provide an independent loop free Layer 2 topology between the customer network and the external network, layer 2 topology control packets originating on the customer network are tagged with a unique identifier as they enter the external network. The control packets may be any type of data packets used to control connectivity provided by network devices comprising a network infrastructure, for example Bridge Protocol Data Units (BPDUs) utilized by the spanning tree protocol. The external network receives control packets from the customer network and tunnels them between a plurality of boundary interface devices at the external network, e.g., by flooding the control packets through the external network. The boundary interface devices may be network devices, such as switches, routers or hubs, which are connected to the customer network. According to one embodiment of the invention, the network devices comprising the external network enter a "preforwarding" state in the event of a topology change in the external network whereby interfaces on the network devices comprising the external network should transition into a forwarding state according to the new topology. According to the preforwarding state, the network devices only forward tunneled control packets from a customer network while preventing the forwarding of general data traffic. Forwarding only control packets back to the customer network when in the preforwarding state ensures that the Layer 2 loop is detected and one or more ports within the customer network are blocked while the service provider network remains unblocked The control packets are flooded such that they are routed back to the customer network based at least in part on the presence of the unique identifier in the control packet. At the customer network, each network device selectively blocks one or more paths within the customer network, e.g., sets a given port's state to blocking or forwarding in accordance with the Layer 2 redundancy protocol being implemented. The blocking of ports at the customer network is based at least in part on the presence of control packets on more than one port on the customer network. According to embodiments of the invention, the customer network selectively blocks ports on its network by implementing the spanning tree protocol, wherein the control packets are BPDUs.

The method further comprises tagging control packets originating on a second customer network with a second unique identifier. The control packets generated by the second customer network are flooded through the external network such that the control packets are routed back to the second customer network based at least in part on the presence of the second unique identifier in the control packets. The second customer network selectively blocks one or more paths within the second customer network in accordance with the Layer 2 redundancy protocol being implemented, e.g., based on the presence of control packets bearing the second unique identifier on more than one port on the second customer network.

According to embodiments of the invention, tunneling or flooding may comprise modifying a destination MAC address of the control packets received from the customer network to indicate an originating boundary interface device. At the destination boundary interface device, the MAC address of the tunneled control packets are again modified to restore the original destination address before transmitting the control packets back to the customer network. Furthermore, the modification need not necessarily be made to the MAC address, the present invention also contemplates providing the necessary data by modifying other fields of the control packet or adding additional fields.

According to various embodiments, a single spanning tree is implemented on the external network and a single spanning tree on the customer network, each spanning tree identified by a unique identifier. Similarly, a single spanning tree may be implemented on the customer network and multiple spanning trees on the external network, each spanning tree identified by a unique identifier. Alternatively, a plurality of spanning trees are implemented on the customer network and a single spanning tree on the external network each spanning tree identified by a unique identifier. A plurality of spanning trees may be implemented on the customer network and a plurality of spanning trees on the external network wherein each of the plurality of spanning trees on the customer network and external network are implemented in separate VLANs.

The present invention also discloses a system for providing a loop free Layer 2 topology between a customer network and an external network. The system of the present invention comprises a customer network implementing a layer 2 redundancy protocol, such as the spanning tree protocol, whereby control packets are propagated throughout the customer network and used by one or more network devices comprising the customer network to maintain a topology free of Layer 2 loops, the customer network further comprising a plurality of connections to the external network.

A unique identifier used to modify each control packet propagated throughout the external network, the unique identifier used to identify a source network of each control packet. A plurality of boundary interface devices are maintained as part of the external network whereby the boundary interface devices define the physical boundary between the customer network and the external network. Control packets are received by the boundary interface devices and flooded through the external network and routed through a boundary interface device back to the customer network based at least on the unique identifier to alert the customer network to a Layer 2 loop.

A second customer network may further be provided. The second customer network implements the spanning tree protocol whereby control packets are propagated throughout the external network and used by one or more network devices comprising the second customer network to maintain a topology free of Layer 2 loops. The second customer network is provided with a plurality of connections to the external network. Each control packet propagated throughout the external network is modified to include a second unique identifier, which is used to identify a source network of each control packet. Control packets are received by the boundary interface devices and flooded through the external network and routed through a boundary interface device back to the second customer network based at least in part on the second unique identifier to alert the second customer network of a Layer 2 loop.

According to various embodiments, the system may comprise the customer network implementing a single spanning tree and the external network implementing a single spanning tree. The system may also comprise the customer implementing a single spanning tree and the external network implementing a plurality of spanning trees, each spanning tree identified by a unique identifier. Alternatively, the customer may implement a plurality of spanning trees and the external implementing a single spanning tree, each spanning tree identified by a unique identifier. A further embodiment contemplates the customer implementing a plurality of spanning trees and the external implementing a plurality of spanning trees.

The present invention also discloses a system for providing a loop free Layer 2 topology between a plurality of customer networks and an external network. The system comprises a plurality of customer networks, each customer network implementing a layer 2 redundancy protocol whereby control packets are propagated throughout the plurality of customer networks and used by one or more network devices comprising the plurality of customer networks to maintain a topology free of Layer 2 loops. Each of the plurality of customer networks further comprises a plurality of connections to the external network.

Each control packet propagated throughout the plurality of customer networks is modified to include a unique identifier, which used to identify a source network of each control packet. According to one embodiment, a unique identifier used to modify a BPDU propagated throughout the external network, the unique identifier used to identify a source network of each BPDU. Alternatively, each control packet may be assigned a unique identifier that may be used to determine a source network for the control packet.

The system further comprises a plurality of boundary interface devices maintained as part of the external network, which define the physical boundary between the plurality of customer networks and the external network. Control packets are received by the boundary interface devices and flooded through the external network and routed through a boundary interface device back to a given customer network based at least in part on the unique identifier to alert the given customer network to a Layer 2 loop.

BRIEF DESCRIPTION OF THE DRAWINGS

The invention is illustrated in the figures of the accompanying drawings which are meant to be exemplary and not limiting, in which like references refer to like or corresponding parts, and in which.

DETAILED DESCRIPTION OF THE PREFERRED EMBODIMENTS

Embodiments of a method, system, and article of manufacture comprising software programs for instantiating a plurality of instances of a layer 2 (L2) redundancy protocol or protocols across multiple networks to ensure that each network topology is free of layer 2 loops in accordance with the present invention are described herein with reference to the drawings in FIGS. 1 through 9.

Figure 1:
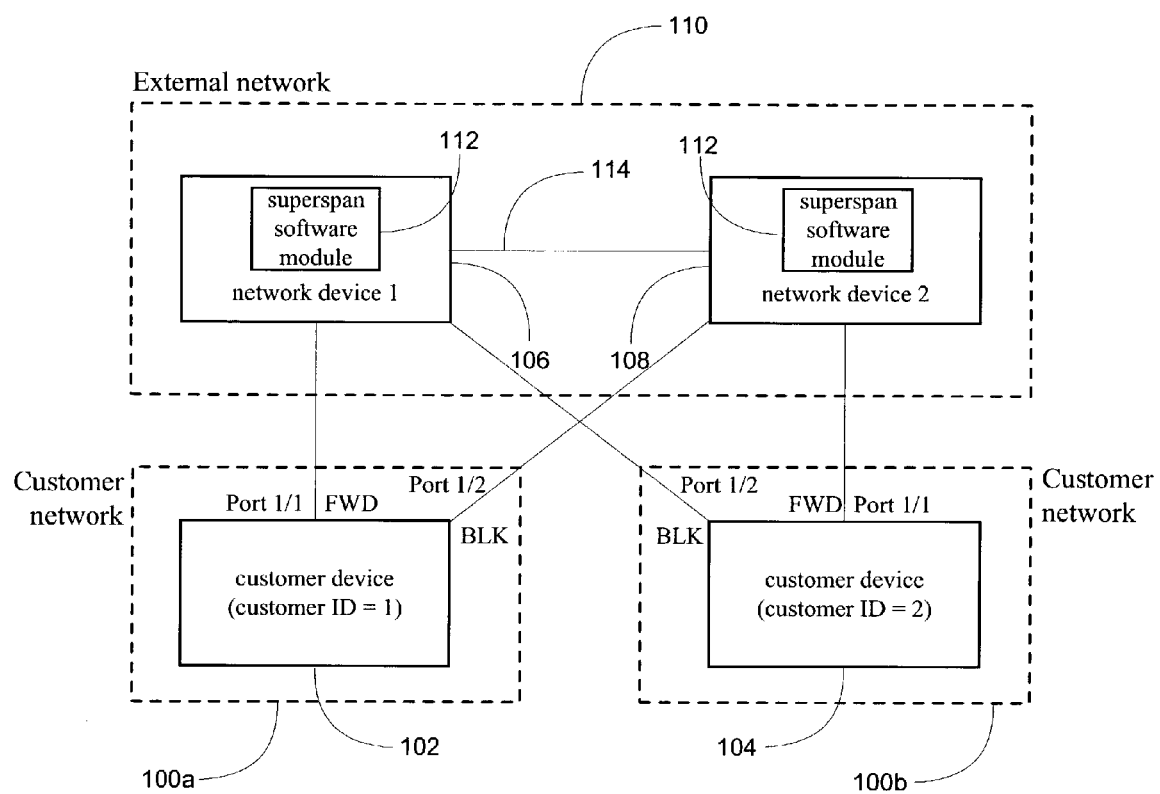
FIG. 1 is a block diagram presenting a configuration in which multiple networks each independently implement a Layer 2 redundancy protocol are connected to a common external network according to one embodiment of the present invention.

Turning to FIG. 1, a network topology comprising hardware and software components configured according to one embodiment of the present invention is illustrated. The network topology presented comprises a number of network devices 102, 104, 106 and 108 performing layer 2 aggregation and switching functionality. As is explained in greater detail herein, each of these layer 2 devices 102, 104, 106 and 108 may comprise hubs, switches, bridges or other network interconnection devices. Furthermore, each network device implements one or more instances of a layer 2 redundancy protocol or protocols. According to one embodiment, network devices 102, 104, 106 and 108 implement the spanning tree protocol, which continually provides a root device connected to a loop free layer 2 topology specifically in the event of a failure of the root device or any active layer 2 path in the topology. Alternatively, the network devices may implement other layer 2 redundancy protocols, such as the Metro Ring Protocol (MRP) or per-VLAN spanning tree plus protocol (PVST+).

In conjunction with implementing a layer 2 redundancy protocol, each network device 106 and 108 in the external network 110 further implements superspan protocol enhancements as provided by the present invention. The use of the superspan protocol allows both an external network 110 and one or more customer networks 100a or 100b to implement one or more instances of a layer 2 protocol or protocols without each implementation interfering with others. An exemplary Layer 2 device 102, 104, 106 and 108 is the FastIron switch available from Foundry Networks of San Jose, Calif.

Each customer network 100a and 100b comprises one or more network devices 102 and 104 comprising a plurality of connections to network devices 106 and 108 that form part of an external network 110. The connections to the external network 110 provide each customer network 100a and 100b with routes to the external network 110 and other networks that the external network 110 is connected to, such as the Internet. In order to maintain a loop free Layer 2 topology, each customer network 100a and 100b implements one or more instances of a layer 2 redundancy protocol or protocols. As illustrated in FIG. 1, it is common to construct Layer 2 networks with redundant connections to improve reliability. To illustrate, a network device 102 operating on customer network 100a maintains two connections to the external network 110, one connection to network device 106 via port 1/1 and one connection to network device 108 via port 1/2. Where both ports are actively passing data packets, however, this redundancy can lead to broadcast storms with data packets looping throughout the network.

A layer 2 redundancy protocol, such as the spanning tree protocol, provides a mechanism for network devices, e.g., network devices 102 and 104, to learn the network topology, elect a root bridge, and selectively block ports to thereby form a loop free topology. Two initial requirement must be met by the network devices participating in the layer 2 redundancy protocol: (1) all network devices exchange information by way of control packets, e.g., Bridge Protocol Data Units (BPDUs), that are transmitted on all routes or ports maintained by the network device and (2) a single root network device be elected based on the exchange of the control packets. The root network device is selected on the basis that it has the lowest bridge identifier value, which is a combination of the network device's unique Media Access Controller (MAC) address and a priority value defined for the given network device.

The root network device on each network 102 and 104 propagates control packets on each of its ports at regular intervals; all other network devices have a root port that is the port with the least cost route to the root network device and is used for receiving control packets from the root network device. After all network devices in the network have determined the configuration of their ports, e.g., blocking or forwarding, each network device only forwards data packets between the root port and the ports that are designated as bridge ports for each network segment to which they are attached. All other ports are blocked so as to prevent them from forwarding data packets, thereby preventing a Layer 2 loop.

In a redundant network architecture like that presented in FIG. 1, however, several problems arise when each customer network 100a and 100b implements one or more instances of its own layer 2 redundancy protocol or protocols. The primary obstacle to implementing a plurality of instances of a layer 2 redundancy protocol or protocols in the architecture of FIG. 1 is that there is no mechanism to restrict control packets intended for a first customer network 100a from another customer network, e.g., customer network 100b. That is, control packets generated by network devices comprising customer network 100a are propagated over links to network devices 106 and 108 comprising the external network 110 without a mechanism to prevent these control packets from inappropriately being forwarded to another customer network 100b. The present invention overcomes these limitations by implementing so-called "superspan" enhancements to a given layer 2 redundancy protocol that allows distinct instances of the given protocol to be simultaneously implemented in both the external network 110 and customer networks 100a and 100b. One example of a commercial embodiment of the superspan enhancements may be found in the Foundry BigIron® network switching devices implementing SuperSpan™.

The superspan enhancement uses the concept of "virtual hubs" and "spanning tree domains" to scale the layer 2 network, thereby allowing a single large layer 2 redundancy domain to be organized into a collection of small, easy-to-manage, and faster-converging domains. As described above, each layer 2 redundancy protocol instantiated in a given domain at a customer network 100a and 100b generates its own control packets, e.g., Bridge Protocol Data Units (BPDUs), which are used to by network devices 102 and 104 to decide which of its redundant interfaces providing a route to the external network 110 should be placed in active or blocking state for that domain.

Software 112 resident on each network device 106 and 108 at the external network 110 that connects to a layer 2 redundancy domain, e.g., a spanning tree instantiated at customer network 100a, are configured to recognize their situation as a boundary between the external network 110 and the customer networks 100a and 100b. Network devices 106 and 108 at the boundary are referred to as boundary devices, each device comprising boundary interfaces that connect to one or more customer networks. Boundary devices and their interfaces partition the control packets in one layer 2 redundancy domain from the other to thereby effectively decouple the layer 2 redundancy protocol implemented in one domain from the other domains, making each domain a self-contained network topology with its own layer 2 redundancy.

According to the architecture illustrated in FIG. 1, the external network 110 comprises two network devices 106 and 108 implementing superspan enhancements by way of a superspan software module 112. Each network device 106 and 108 comprising the external network 110 is symmetrically connected to two customer networks 100a and 100b, each customer network implementing its own instance of a layer 2 redundancy protocol. The superspan enhancements prevent layer 2 loops in the traffic flow with each customer while at the same time isolating traffic to and from each customer network 102 and 104. In this example, the network device 102 connecting customer network 100a to the external network 110 has two interfaces to the external network 110, ports 1/1 and 1/2. The external network devices 106 and 108 comprising the external network 110 behave similar to a non-blocking hub whereby control packets from both customer networks 100a and 100b are tunneled through the external network 110 back to a given source network for the control packet. To prevent a Layer 2 loop, the customer network 102 places port 1/2 into a blocking state.

Network devices 106 and 108 on the external network 100 execute a superspan software module 112 to tunnel packets and thereby route them back to a given origination network. The superspan software module 112 utilizes a unique identifier to identify and ensure proper tunneling of control packets received at the external network 110 from customer networks 100a and 100b. The layer 2 redundancy protocol or protocols that the customer networks 100a and 100b implement do not interfere with one another because the superspan software 112 executing at external network devices 106 and 108 isolate each network's control packets based on the unique identifier generated by network devices 102 and 104 comprising each customer network 100a and 100b and associated with a given network's control packets.

When the external network 110 receives a control packet from a customer network 100a and 100b on a boundary interface, e.g., external network devices 106 and 108, the superspan software module 112 changes the MAC address of the received control packet. According to one embodiment of the invention, the control packets is a spanning tree BPDU and the superspan software module 112 modifies the MAC address of the received BPDU such that the first byte (locally administered bit) is changed from 01 to 03 to indicate that the BPDU needs to be tunneled between the boundary interfaces. Furthermore, the superspan software module 112 modifies the fourth and fifth bytes to include the transmitting customer network's 100a and 100b unique identifier as specified on the boundary interface 106 and 108. By way of example, where the bridge group MAC address is 01-80-c2-00-00-00, the superspan software module 112 may modify the address to indicate the origination network of the control packet, e.g., customer network 100a, thereby resulting in a modified MAC address of 03-08-c2-00-01-00 and preventing the control packet from being forwarded to a network other than the origination network.

Each network device 106 and 108 in the external network 110 implementing the superspan enhancements floods the control packets through the external network using the modified destination MAC address. At other network devices connected to the origination customer network, e.g., external network device 108, the superspan software module 112 changes the destination MAC address back to the bridge group address to indicate to the customer network that identical traffic is appearing on two ports, thereby allowing the customer network to block one port and resolve the Layer 2 loop. This technique is referred to a "tunneling" as each customer network's control packets are flooded through the external network in a distinct tunnel based on the customer identifier for the customer network. For example, control packets received from customer network 100a may be received at network device 106, flooded through the external network 110 and passed back through the boundary interface at network device 108 to the customer network 100a. Although the control packets are flooded through the external network 110, there is a logical link 114 between the network devices 106 and 108 comprising the boundary interface. Alternatively, flooding may comprise selectively forwarding packets throughout the network or selectively forwarding only toward interested recipients, e.g., through the use of GARP Multicast Registration Protocol (GMRP, wherein GARP stands for Generic Attribute Registration Protocol).

Figure 2:
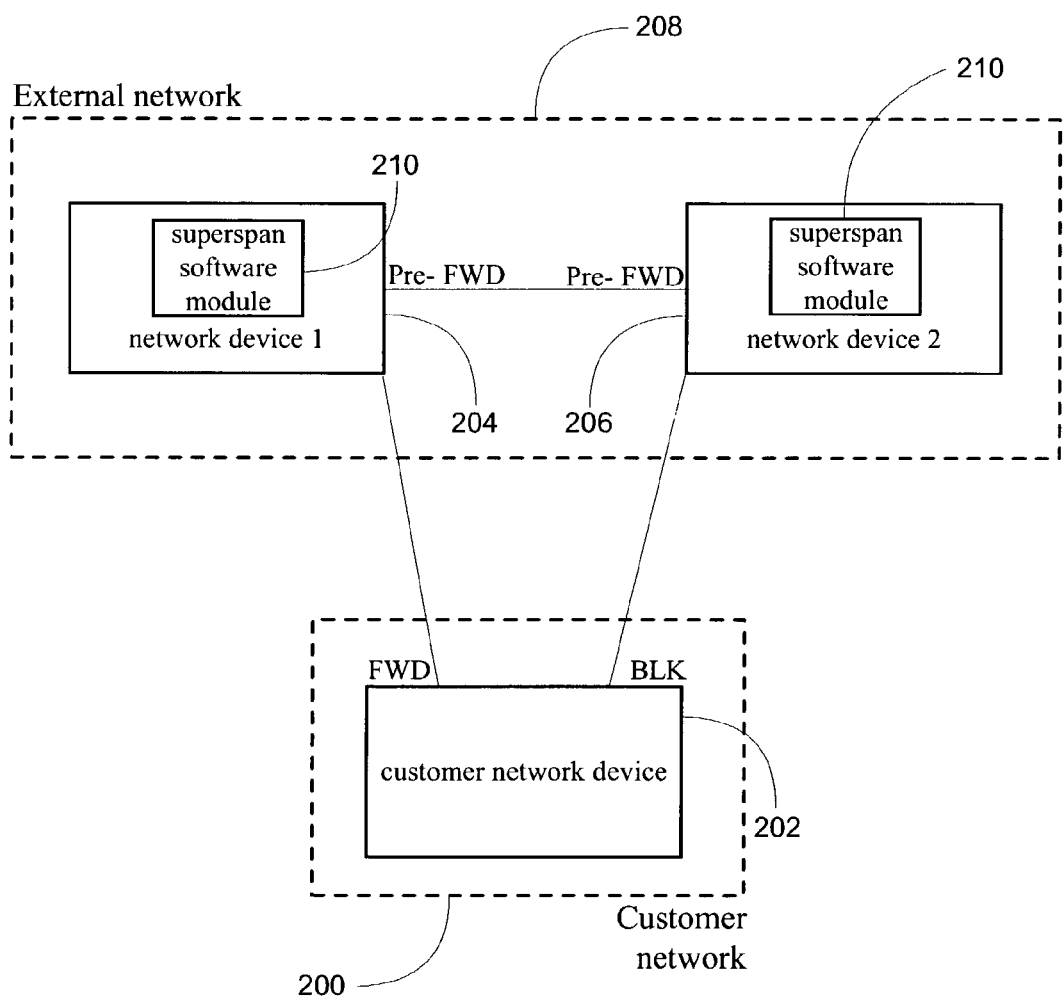
FIG. 2 is a block diagram presenting a customer spanning tree network connected to network devices maintained by an external network that are in a preforwarding state according to one embodiment of the present invention.

FIG. 2 builds on the embodiment introduced in FIG. 1 by illustrating the convergence of a one or more layer 2 redundancy protocols implemented at single customer network comprising symmetrical connections to network devices maintained by an external network. To ensure that the customer network 200 has adequate time to converge at layer 2 and prevent problematic loops, the superspan software module 210 forces each external network device, e.g., network devices 204 and 206, to enter a special state referred to as "preforwarding", occurring between the learning and forwarding states, which lasts long enough to tolerate minimal control packet loss. According to one embodiment, where a hello timer is set to a value of H, preforwarding may last 2H+1. If the hello timer is two seconds, the preforwarding state is entered into for a duration of five seconds.

During the preforwarding state, the external network devices 204 and 206 only forward tunneled control packets from the customer network 202 and prevent the forwarding of general data packet traffic. Forwarding only control packet traffic back to the customer network 202 ensures that the customer network 202 detects the layer 2 loop and blocks one or more ports within the customer network 202, while the external network remains unblocked. After the preforwarding state, the external network devices 204 and 206 switch over to the forwarding state and continue to forward control packets in addition to general data packet traffic. According to certain embodiments of the invention, the superspan software module 210 must be enabled on at least the VLANs that are tunneling customer traffic.

Figure 3:
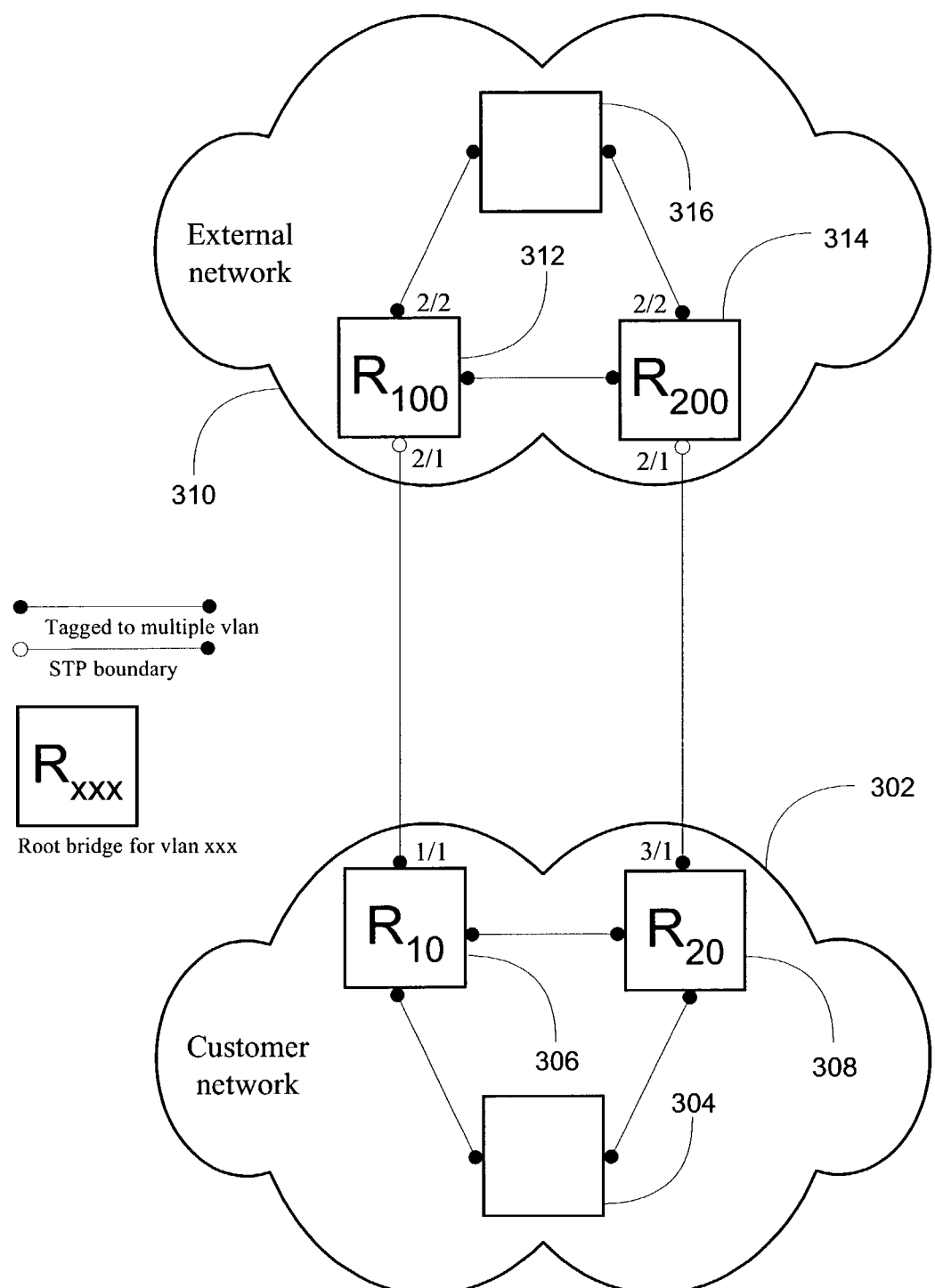
FIG. 3 is a block diagram presenting a customer network and external network each implementing multiple spanning trees according to one embodiment of the present invention.

FIGS. 3 through 6 present embodiments of the invention whereby various combinations of single and multiple layer 2 redundancy protocols are implemented on external and customer networks. Turning to FIG. 3, an illustration of the superspan enhancements is presented wherein both the customer network 302 and the external network 310 implement multiple instances of a layer 2 redundancy protocol or protocols, e.g., a separate spanning tree in each port-based VLAN.

In this embodiment, both the customer network 302 and the external network 310 are running multiple instances of a layer 2 redundancy protocol, one per port-based VLAN in a layer 2 switched network. The customer network 302 comprises VLANs 10 (306) and 20 (308) while the external network comprises VLANs 100 (312) and 200 (314). Traffic from the customer network from VLANs 10 and 20 is aggregated by VLAN 100 at the external network because the boundary ports 312 and 314 are untagged members of VLAN 100. By adjusting the bridge priority of VLANS 10 and 20, 306 and 308, respectively, the administrator of the customer network may select a different root bridge for each layer 2 redundancy protocol running on the customer network.

In the present illustration, the layer 2 redundancy protocol implemented in VLAN 10 transmits control packets over the network 302, which are passed to the external network. At the external network 310, the control packets are modified and flooded throughout network device 312, 314 and 316 comprising the network 310. Boundary interface network device 314 receives the control packets and restores them to their original states, which are then passed back to the customer network 302.

Based on this, network device 306 is transitions to become the root bridge for the VLAN, thereby setting port 1/1 on network device 306 to forwarding while blocking port 3/1 on network device 308. The opposite implementation occurs for the layer 2 redundancy protocol implemented on VLAN 20 (308). As a result, both links 306 and 308 connecting the customer network 302 and the external network 310 are fully utilized and serve as backup links at the same time, thereby providing a loop free, non-blocking topology. In the external network 310, multiple instances of a layer 2 redundancy protocol are running, one for VLAN 100 (312) and one for VLAN 200 (314) to ensure a loop free, non-blocking topology is maintained for each VLAN. Boundary interfaces are configured at network devices 312 and 314. Because traffic from the customer network 302 is aggregated into a single network device 312, the external network 310 appears to the customer network 302 as a loop free non-blocking hub when port 2/2 on R200 (314) is blocked by the layer 2 redundancy protocol operating in VLAN 100 (312). Furthermore, according to the present invention, boundary interfaces 2/1 (312) and 2/1 (314) do not transmit layer 2 redundancy protocol control packets generated at the external network out towards the customer network 302.

Figure 4:
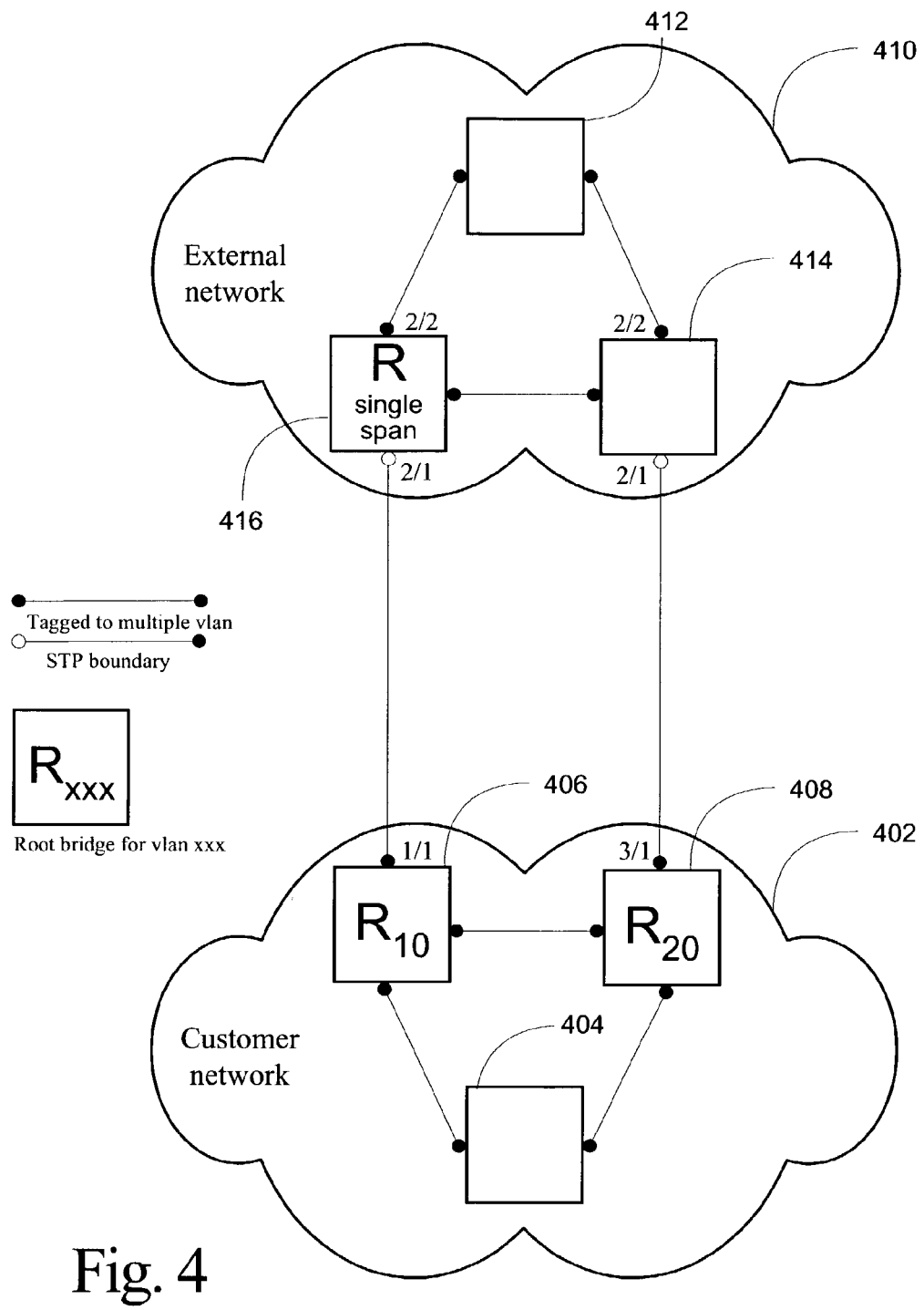
FIG. 4 is a block diagram presenting a customer network implementing a plurality of spanning trees and a external network implementing a single spanning tree according to one embodiment of the present invention.

FIG. 4 presents an alternative embodiment of the invention whereby the customer network 402 implements multiple instances of a layer 2 redundancy protocol while the external network 410 implements a single instance of a layer 2 redundancy protocol. At the customer network 402, an instance of a layer 2 redundancy protocol is implemented on each VLAN, identified by root network device 406, which is the root network device for the layer 2 redundancy protocol implemented on VLAN 10, and root network device 408, which is the root network device for the layer 2 redundancy protocol implemented on VLAN 20.

The external network 410 implements a single spanning tree with one root network device 416. The external network 410 is free to implement multiple VLANs at the network core to segregate traffic on a per customer basis. All VLANs, however, have the same network topology because the route for each VLAN is calculated by the single instance of a layer 2 redundancy protocol implementation, e.g., a single spanning tree ending at the root network device 416 for the spanning tree. The loop free, non-blocking network provided by the external network 410 is treated as a hub by the customer network 402, with boundary ports 2/1 on each boundary interface 414 and 416 being an untagged member of a common VLAN, e.g., VLAN 100; traffic from all VLANs maintained by the customer network is aggregated through the common VLAN at the boundary interface network devices. This configuration laves the customer network's switching pattern virtually unchanged from the scenario presented in FIG. 3 as the external network 410 is perceived as a virtual hub by the customer network 402, with maintenance of the virtual hub's loop free topology remaining transparent to the customer network 402.

Figure 5:
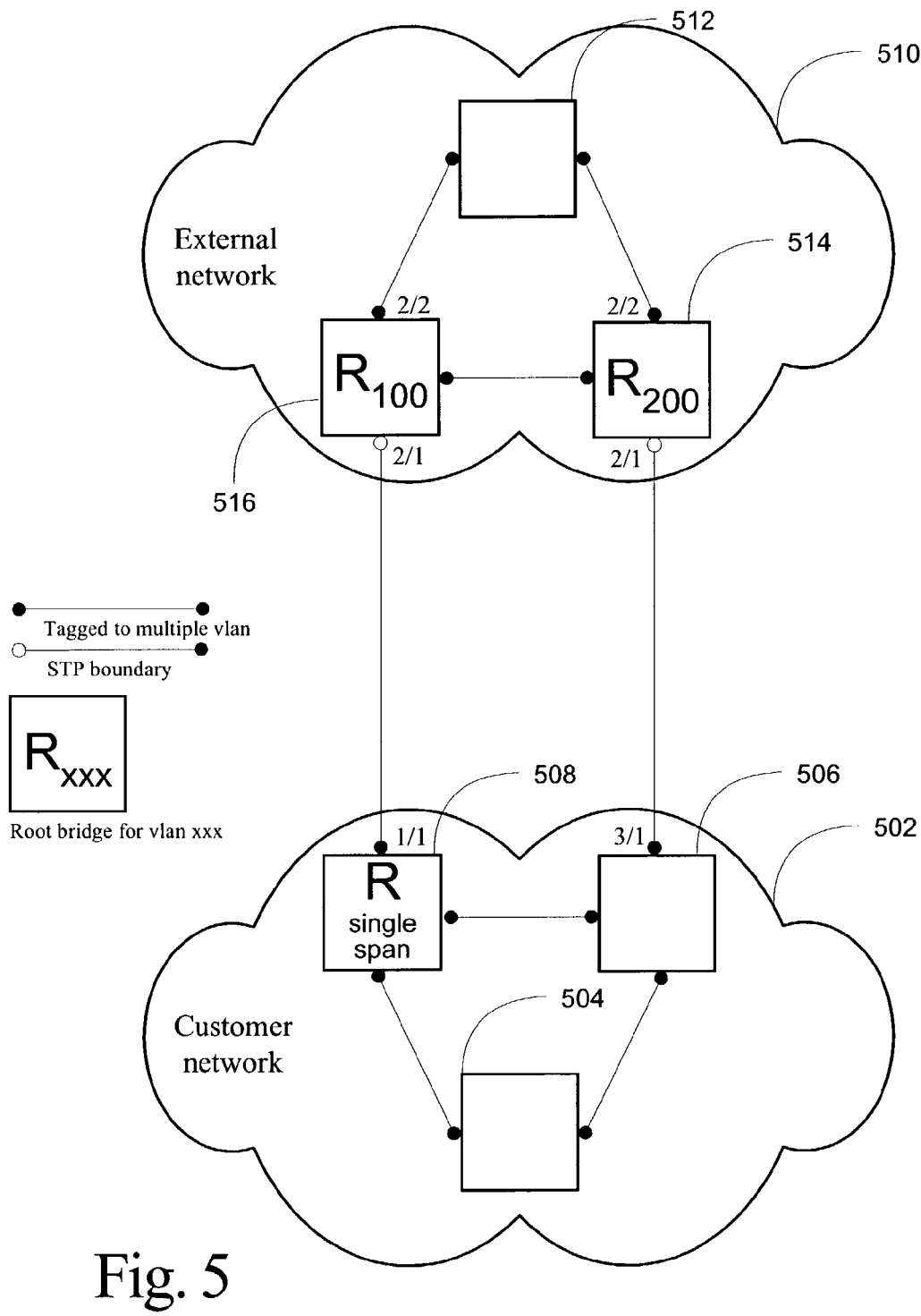
FIG. 5 is a block diagram presenting a customer network implementing a single spanning tree and a external network implementing a plurality of spanning trees according to one embodiment of the present invention.

A third embodiment of an architecture implementing the superspan enhancements is presented in FIG. 5 whereby the customer network 502 implements a single instance of a layer 2 redundancy protocol with a single root network device 508, while the external network maintains multiple instances of a layer 2 redundancy protocol, identified by root network device 514, which is the root network device for the layer 2 redundancy protocol implemented in VLAN 100, and root network device 516, which is the root network device for the layer 2 redundancy protocol implemented in VLAN 200.

Traffic from the VLANs maintained on the customer network 502 all pass through the root network device 508 for the single implemented instance of a layer 2 redundancy protocol and are carried, or aggregated, at VLAN 100 maintained by external network device 516 at the boundary interface on the external network 510. The main difference between the scenarios presented in FIG. 5 and those of FIGS. 3 and 4 is that all traffic at the customer network 502 follows the same path, each path having the same layer 2 redundancy protocol root network device in all VLANs. Loop free, non-blocking topologies are still separately maintained at the customer network 502 via a single instance of a layer 2 redundancy protocol and at the external network 510 via per-VLAN instances of a layer 2 redundancy protocol, VLAN 100 identified by root network device 516 and VLAN 200 identified by root network device 514.

Figure 6:
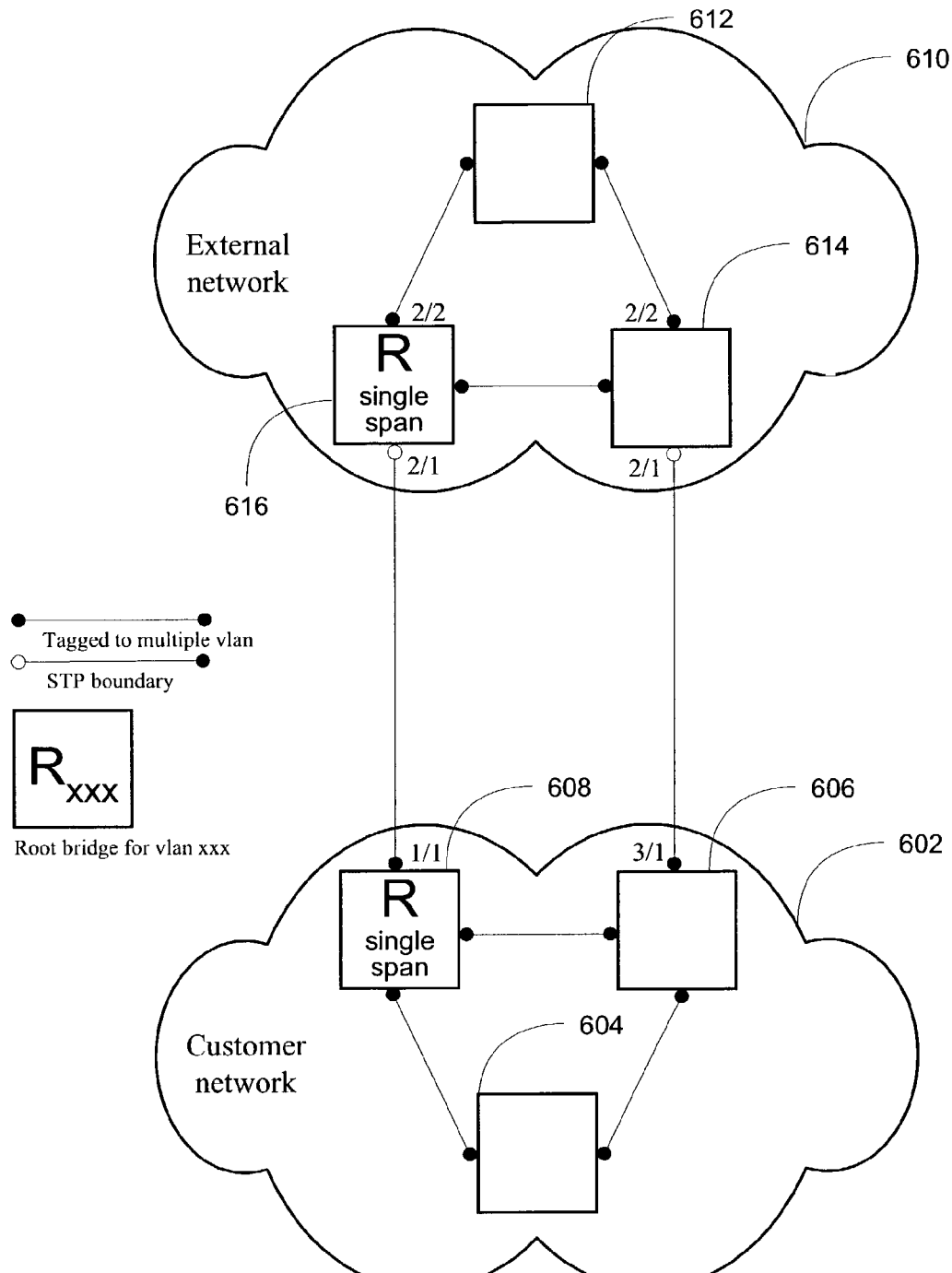
FIG. 6 is a block diagram presenting a customer network implementing a single spanning tree and a external network implementing a single spanning tree according to one embodiment of the present invention.

A simple embodiment illustrating superspan functionality is presented in FIG. 6. In this embodiment, both the customer network and the external network implement their own single instance of a layer 2 redundancy protocol in order to provide loop free, non-blocking Layer 2 topologies. Traffic from all VLANs maintained at the customer network 602 is routed through the single layer 2 redundancy protocol's root network device 608, which is carried, or aggregated, to the external network device 616 as in the previous scenario. Loop free, non-blocking topologies are still separately maintained by a single instance of a layer 2 redundancy protocol on the customer network 602 and a single instance of a layer 2 redundancy protocol on the external network 610.

Figure 7:
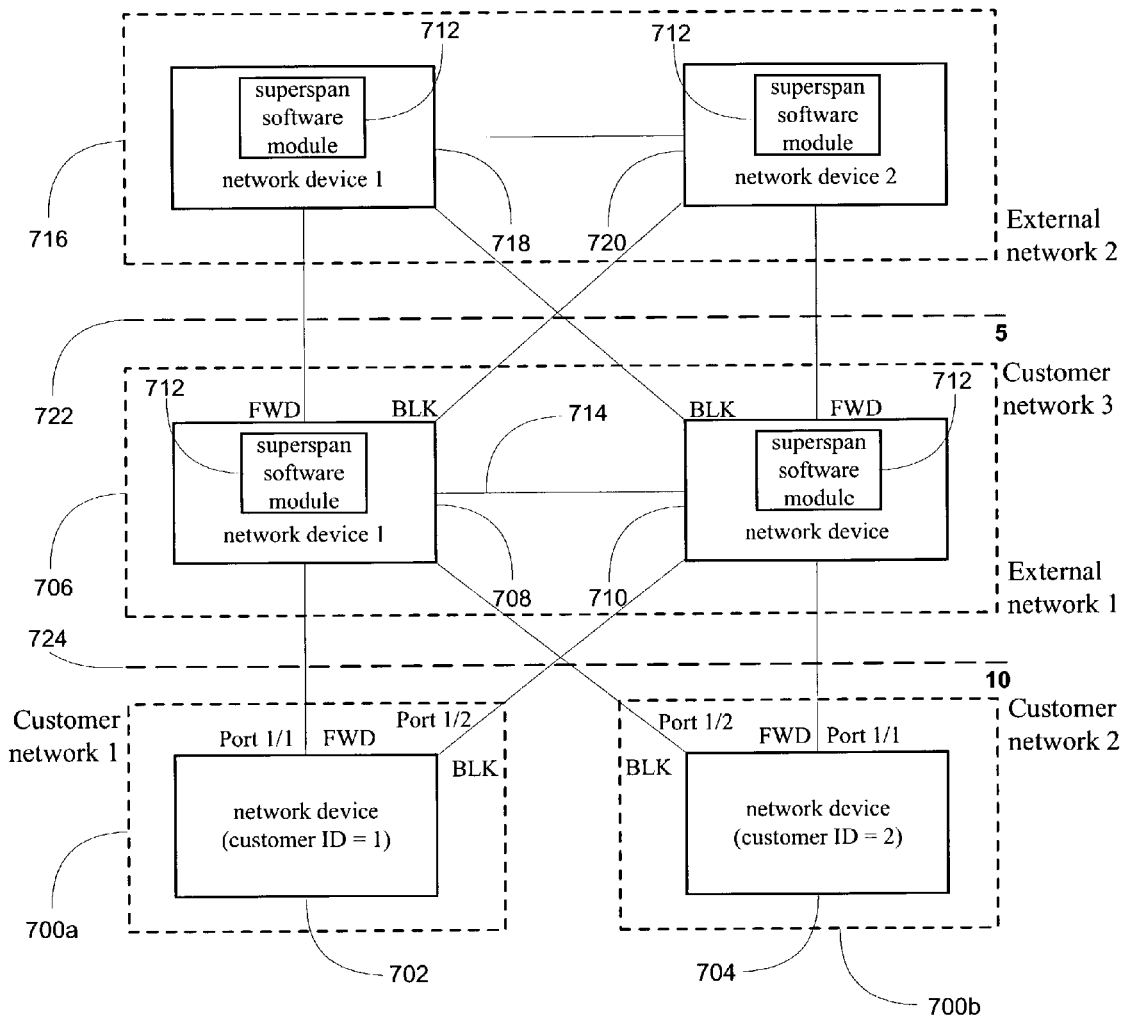
FIG. 7 is a block diagram presenting multiple interconnected networks, each instantiating one or more independent layer 2 redundancy protocols according to one embodiment of the present invention.
Figure 8:
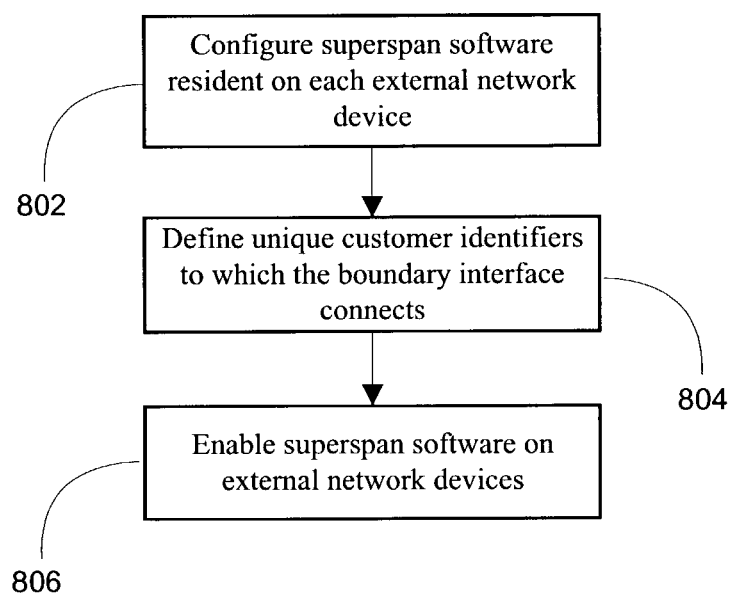
FIG. 8 is a flow diagram presenting a method of configuring a external network device to operate according to one embodiment of the present invention.

The superspan enhancements of the present invention may also operate in a "ladder" configuration as presented in FIG. 7 whereby a first network is an external network as to a first set of customer networks and a customer network as to a second external network, e.g., a network is both a customer network and an external network. Two customer networks are provided 700a and 700b, each comprising network devices implementing one or more instances of a layer 2 redundancy protocol or protocols, e.g., network devices 702 and 704, respectively. The layer 2 network devices 702 and 704 generate control packets as part of their implementation of the layer 2 redundancy protocol, which are propagated from the customer networks 700a and 700b to a first external network 706.

The control packets, each comprising or associated with a unique identifier identifying the customer network from which the control packet came, are manipulated by the receiving network device 708 and 710 and flooded through the external network 706. A network device 708 and 710 that is configured as a boundary interface with a given client network 700a and 700b intercepts the flooded control packet based on the packet's destination and customer identification information. The intercepting network device 708 and 710 reverts the data in the control packet to its original state and the control packet is passed back to the originating customer network 700a and 700b. By flooding control packets and transmitting them back to the originating customer network based on the customer identifier, the customer network is alerted to a layer 2 loop which may be eliminated by selectively blocking ports on network devices 702 and 704 in a customer network. Furthermore, control packets for various networks 700a and 700b connecting to the external network 706 are advantageously isolated from one another, e.g., they are tunneled through the external network 706 based on their associated customer identifier, in addition to be isolated from control packets generated at the external network 706.

It is also possible to implement one or more instances of a layer 2 redundancy protocol at the external network 706. Because the external network 706 is attached to a core region, e.g., the external network 706 is a secondary core, the external network 706 appears as a customer network to the second external or core network 716. Network devices 708 and 710 at the external network 706 are configured with a unique customer identifier that is associated with control packets generated by the one or more layer 2 redundancy protocol or protocols that are implemented at the external network 706. Superspan software 712 operating on each network device 708 and 710 prevents the control packets from being propagated to the external network's 706 customer networks 700a and 700b.

The control packets, each comprising or associated with a unique identifier identifying the customer 706 from which the control packet came, are manipulated by the receiving network device 718 and 720 and flooded through the external network 716. The network device 718 and 720 that is configured as a boundary interface with a given client network 706 intercepts the flooded control packets based on the packet's destination and customer identification information. The intercepting network device 718 and 720 reverts the data in the control packet to its original state and the control packet is passed back to the originating customer network 706. By flooding control packets and transmitting them back to the originating customer network 706 based on the customer identifier, the customer network 706 is alerted to a layer 2 loop which may be eliminated by selectively blocking ports on network devices 708 and 710 in a customer network. Furthermore, control packets for various networks connecting to the external network 716 are advantageously isolated from one another, e.g., they are tunneled through the external network 716 based on their associated customer identifier.

According to an alternative embodiment, each region 700a and 700b, 706 and 716 is assigned a priority or customer identifier (CID) value that is associated with control packets generated by any given layer 2 redundancy protocol implemented in one of the networks 700a and 700b, 706 and 716700a and 700b, 706 and 716. The core network 716 tunnels control packets from the edge 700a and 700b through the secondary core 706. As networks are progressively further away from the core, progressively higher CID values are assigned to the interfaces between the networks 722 and 724. At any given boundary port, control packets comprising non-matching CID values—non-matching in that the CID carried by the received control packet does not match the CID for the receiving boundary port—where ($CID_{controlpacket} > CID_{boundary}$) are propagated through the receiving network unchanged One embodiment of a method for configuring network devices comprising the external network is presented in FIG. 8. A network device administrator at the external network configures superspan software resident on all devices in the same broadcast domain in the external network that are connected to a customer network, step 802. Superspan software may comprise program code stored in an EEPROM or any other suitable memory media that may be accessed by the external network device in order to execute the program code contained therein and execute methods of the present invention.

The administrator defines the unique customer identifiers that represent customer networks to which each boundary interface connects, step 804. The same unique identifier is defined at each boundary interface that connects to a given customer network. When tunneling control packets for a given customer network through the network devices that comprise the external network, the network devices use the identifier to ensure that control packets are forwarded only to the intended customer network. The superspan software is enabled, step 806, allowing the network device to enter preforwarding mode thereby indicating to a connected customer network that a loop is present and a selected port must be set to blocking mode.

Exemplary commands for configuring one of the two boundary interfaces presented in FIG. 1 are introduced in Table 1 below. These commands may be supplied via a command line or other interface provided by the superspan software or other operating software executing on the network device. Alternatively, an administrator may execute commands through the use of one or more scripts as is well known to those of skill in the art.

TABLE 1 interface 1/1
stp-boundary 1
interface 1/2
stp-boundary 2

These commands configure two interfaces on the network device as superspan boundaries. Interface 1/1 is a boundary interface for a first customer whereas interface 1/2 is a boundary interface with a second customer. Each boundary is associated with a unique number that identifies the customer network for which the network device is acting as a boundary interface. Alternatively, the unique identifier may be a more complex alpha or alphanumeric character or characters. Each customer, however, is allocated a unique identifier used at every boundary interface to identify and distinguish each customer's control packets.

Figure 9:
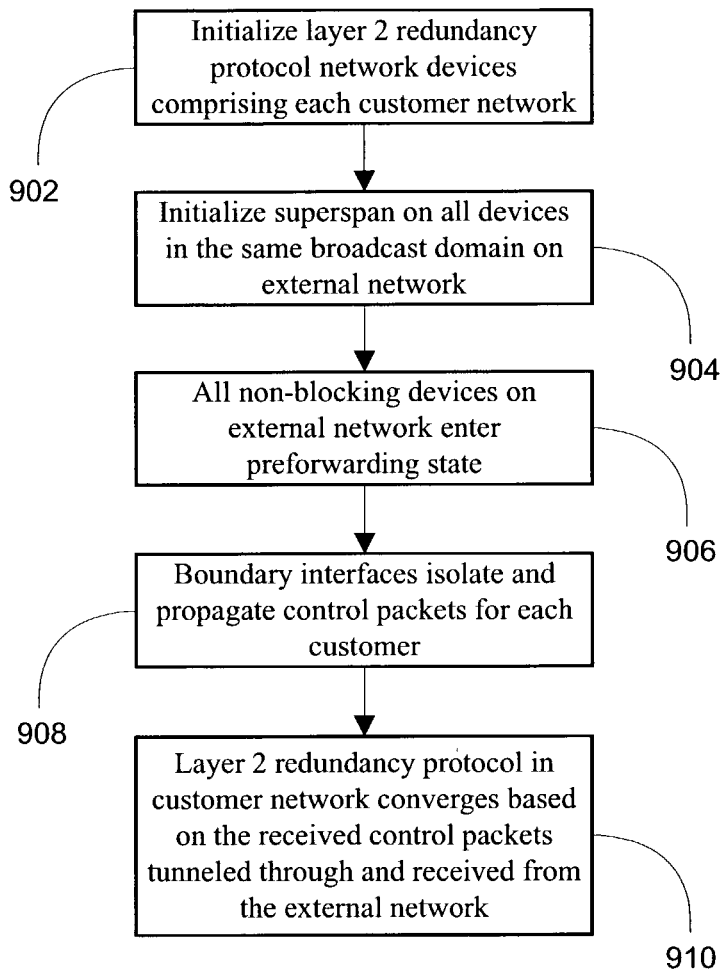
FIG. 9 is a flow diagram presenting a method of operating various embodiments of the system of the present invention according to one embodiment of the present invention.

One embodiment of a method for operating embodiments of the systems presented in FIGS. 1 through 7 is presented in FIG. 9. A customer network is initialized and all Layer 2 devices cycle their power or are otherwise initialized from a non-initialized state, step 902, thereby initiating the layer 2 redundancy protocol that the layer 2 devices support. All network devices comprising the external network, including those boundary interface network devices that comprise a connection to a customer network, initialize their superspan software as previously described in order for the external network to appear as a single non-blocking virtual hub, step 904.

At the external network, the network devices that form the boundary interface for the given customer enter preforwarding mode, step 906, whereby control packets are received at one port of the interface, tunneled through the network devices comprising the external network, and transmitted back to the customer network across other connections between the customer network and the boundary interface, thereby alerting the customer network to a loop, step 908. The control packet propagation of step 908 is conducted for each customer network attached to the external network whereby each customer network's control packets are isolated from each other via a unique identifier that is associated with each control packet that a customer network generates. Based in part on the information contained in the control packets that are tunneled back to the customer network, network devices in the customer network enter a converges; ports are selectively blocked in order to prevent loops in the topology, step 910. Advantageously, this allows multiple customers that share a boundary interface with an external network to each implement one or more instances of a layer 2 redundancy protocol or protocols for loop avoidance while not interfering with the other.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method performed by a network device for use in a first network, the method comprising:
    modifying, by the network device, a MAC address of a Bridge Protocol Data Unit (BPDU) to include a unique identifier that identifies a second network as a source network for the BPDU,
    wherein the first network is configured to implement a first instance of Spanning Tree Protocol (STP),
    wherein the second network is configured to implement a second instance of STP that is separate from the first instance, and
    wherein the modifying causes the BPDU to be flooded through the first network in a tunnel and routed back to the second network from the first network based on the presence of the unique identifier in the BPDU, the BPDU being configured to facilitate convergence of the second instance of STP upon being routed back to the second network.

2. The method of claim 1 further comprising forwarding the BPDU to one or more network devices at the first network.

3. The method of claim 2 wherein forwarding the BPDU comprises flooding the BPDU.

4. The method of claim 1 further comprising modifying, by the network device, a second BPDU to include a second unique identifier that identifies a third network as a source network for the second BPDU, wherein the third network is configured to implement a third instance of STP separate from the first and second instances, and
    wherein the modifying of the second BPDU causes the second BPDU to be routed back to the third network from the first network based on the presence of the second unique identifier in the second BPDU.

5. The method of claim 1 further comprising:
    entering a preforwarding state; and
    while in the preforwarding state, preventing the forwarding of general data packet traffic.

6. The method of claim 1 wherein modifying the MAC address of the BPDU to include the unique identifier comprises modifying fourth and fifth bytes of the MAC address.

7. A network device for use in a first network, the network device comprising:
    a processor; and
    a non-transitory data store having stored thereon program code which, when executed by the processor, causes the processor to:
        modify a MAC address of a BPDU to include a unique identifier that identifies a second network as a source network for the BPDU, wherein the first network is configured to implement a first instance of STP, wherein the second network is configured to implement a second instance of STP separate from the first instance, and wherein the unique identifier allows the BPDU to be flooded through the first network in a tunnel and routed back to the second network from the first network based on the presence of the unique identifier in the BPDU, the BPDU being configured to facilitate convergence of the second instance of STP upon being routed back to the second network.

8. The network device of claim 7 wherein the program code further causes the processor to:

modify a second BPDU to include a second unique identifier that identifies a third network as a source network for the second BPDU, wherein the third network is configured to implement a third instance of STP separate from the first and second instances, and wherein the second unique identifier allows the second BPDU to be routed back to the third network from the first network based on the presence of the second unique identifier in the second BPDU.

9. The network device of claim 7, wherein the modifying is performed by the processor while the network device is in a pre-forwarding state, and wherein the network device is unable to forward any packets other than BPDUs from the second network while the network device is in the pre-forwarding state.

10. The network device of claim 7 wherein the program code further causes the processor to forward the BPDU to one or more network devices at the first network.

11. The network device of claim 10 wherein forwarding the BPDU comprises flooding the BPDU.

12. The network device of claim 7 wherein the program code further causes the processor to enter a preforwarding state in which the processor prevents the forwarding of general data packet traffic.

13. The network device of claim 7 wherein modifying the MAC address comprises modifying fourth and fifth bytes of the MAC address.

* * * * *